2

United States Patent Office 3,511,793
Patented May 12, 1970

3,511,793
MODIFIED VINYLIDENE CHLORIDE COPOLYMER COATING COMPOSITION
James Burnett Ezell, Richmond, Va., assignor to E. I. du Pont de Nemours and Company, Wilmington, Del., a corporation of Delaware
No Drawing. Filed Sept. 13, 1968, Ser. No. 759,783
Int. Cl. C08f 37/12, 45/36
U.S. Cl. 260—23          5 Claims

ABSTRACT OF THE DISCLOSURE

The crimp jaw release characteristics of vinylidene chloride copolymer-coated organic packaging film is improved by including in the coating composition a controlled amount of behenic acid.

---

It is now conventional practice to provide organic films to be used as wrapping material (e.g., regenerated cellulose film) with a continuous heat sealable vinylidene chloride copolymer coating. However, where films coated with available vinylidene chloride copolymer coating compositions are to be used in the fabrication of packages which are sealed by means of crimped jaw sealers, complication arises in that the coated films show a tendency to cling to the crimped jaw of the sealing machine, causing the machine to jam. It is readily apparent that for smooth packaging machine operations the film should readily release from the sealing surface with no delay if (1) considerable loss of machines operating time while shutdown for cleaning, (2) loss of product and (3) loss of packaging film are to be avoided.

Accordingly, it is the principal object of this invention to provide a vinylidene chloride copolymer coated film which can be used on sealing machines at high efficiency.

The foregoing and related objects are realized by the present invention which employs as the coating composition a composition comprising essentially a volatile organic solvent solution of (1) 95 parts by weight of a copolymer of vinylidene chloride and at least one other ethylenically unsaturated monomer copolymerizable therewith, the copolymer containing at least 87% by weight of vinylidene chloride, and (2) from 0.5 to 3.0 parts by weight of behenic acid. The composition may comprise additionally (a) from 0.5 to 3.0 parts by weight of a diamide having the formula R(NHCO—R$_1$)$_2$ where R is an alkylene radical selected from the group consisting of methylene and ethylene radicals, and R$_1$ is a monovalent radical selected from the group consisting of alkyl and alkenyl radicals having from 10 to 22 carbon atoms, (b) from 0.5 to 3.0 parts by weight of a paraffin hydrocarbon wax having a melting point above 55° C., and (c) from 0.2 to 1.0 part by weight of a solid particulate material having an average particle size in the range of 0.5 to 10 microns, and may further comprise from 0.5 to 2.0 parts by weight of a stearate salt of an alkali metal.

In general, the vinylidene chloride content of the vinylidene chloride copolymers used herein should be at least 87% by weight. Ethylenically unsaturated monomers that can be copolymerized with vinylidene chloride to produce suitable coating compositions include those described in U.S.P. 3,179,532. Specific copolymers include vinylidene chloride/acrylonitrile copolymer of weight ratio 90.5/9.5; vinylidene chloride/acrylonitrile/itaconic acid copolymer in weight ratio 90.5/9/0.5, vinylidene chloride/methyl methacrylate/itaconic acid copolymer in weight ratio 90/9.5/0.4 and vinylidene chloride/acrylonitrile/methyl methacrylate/itaconic acid in weight ratio 91.5/6/2/0.5.

Representative of the diamides useful herein are ethylene bis-oleamide, ethylene bis-erucamide, ethylene bis-stearamide, methylene bis-stearamide, methylene bis-oleamide, ethylene bis-lauramide, ethylene bis-myristamide and methylene bis-palmitamide.

While the composition of this invention has its principal application in the production of regenerated cellulose film, and will be described hereinafter with specific reference to such film, it is to be understood that other organic films heretofore employed as substrates for vinylidene chloride copolymer coatings are similarly useful herein. These include films of methyl cellulose, ethyl cellulose, hydroxy ethyl cellulose, hydroxy propyl cellulose, polyvinyl alcohol, partially hydrolyzed ethylene vinyl acetate copolymers, polyolefins such as polyethylene and polypropylene, polyesters, polyamides, polyvinyl chloride, polystyrene, polyvinyl fluoride, etc.

The coating solutions are made up following conventional procedures for making coating baths of high polymeric material. The solids content of the coating bath is usually in the order of 10 to 25%. The coating solution can be made, for example, by charging the vinylidene chloride copolymer, the high melting diamide, the paraffin wax, the particulate and the behenic acid in the required amount of solvent, usually a mixture of toluene with another solvent such as tetrahydrofuran or methyl ethyl ketone, and the entire ingredients are agitated in an appropriate vessel at 40° C. until the solution is complete. Alternately, the various ingredients can be dissolved in either of the solvent components and the resulting solutions containing the various ingredients can then be mixed together along with the particulates to give the desired coating solution. The coating solutions thus prepared can be applied by conventional coating methods to the appropriate base sheet. A typical base sheet, for example, would be a regenerated cellulose film containing about 15% of glycerol or an alternate softening agent and in the order of 0.4% by weight of a melamine/formaldehyde resin. The coating can be accomplished on a conventional coating machine where the solution is applied to the film, excess solution is removed by drawing the film through a pair of doctor rolls and the solvent removed by passing the film bearing the coating through a drying tower.

The following example will serve to further illustrate the principles and practice of my invention. Parts and percentages are by weight.

EXAMPLE

Coating lacquers are made by dissolving 95 parts of a vinylidene chloride copolymer consisting of a 91.5/6/2/0.5 vinylidene chloride/acrylonitrile/methyl methacrylic/itaconic acid copolymer, 1 part of ethylene bis-oleamide, 1 part of paraffin wax (Aristowax—Sonneborn Chemical & Refining Co.), 0.3 part of steatite talc (Mistron HGO-55—Sierra Talc and Clay Co.) and with varied amounts of behenic acid (0, 1, 2 parts in a 60/40 mixture of tetrahydrofuran and toluene at a solids content of 18%. The vinylidene chloride copolymer is slurried in about 70 parts of toluene to which the tetrahydrofuran is added after about 30 minutes and the resulting mixture is stirred at 40° C. until solution is complete. To this is added a solution of the other ingredients in the remainder of the toluene and the combined mixture is stirred at 40° C. for about an hour. The respective coating lacquers are coated on regenerated cellulose film bases containing about 18% by weight of glycerol and 0.4% of a modified melamine/formaldehyde anchoring resin. The resulting coated films are then tested for crimp jaw release properties (i.e., grams per square inch of sealed area required to release the sealed film from the sealer jaws), as follows: two films each 6 inches wide are sealed together between crimped sealing jaws to form a sealed area measuring 6 les by 0.5 inch; the sealed films are pulled away from jaws around a freely suspended roll mounted on a in gauge, which is in turn connected to a recorder; force necessary to remove the film from the sealing is thus automatically measured and recorded. The lts are shown in the following table:

| ent behenic acid in bath | Crimped jaw release (grams) | | |
|---|---|---|---|
| | 116° C. | 127° C. | 138° C. |
| ntrol) | 235 | 250 | 240 |
| | 75 | 45 | 105 |
| | 40 | 10 | 0 | esults substantially the same as those described above the test and control films are obtained when the vinyli- chloride copolymer comprises vinylidene chloride/ lonitrile (90.5/9.5) and vinylidene chloride/acrylo- le/itaconic acid (90.5/9.0/0.5) or vinylidene chlo- /methyl acrylate/itaconic acid (90/9.5/0.5).
claim:

A heat-sealable coating composition for organic meric film comprising essentially a volatile organic ent solution of (1) 95 parts by weight of a copolymer inylidene chloride and at least one other ethylenically turated monomer copolymerizable therewith, the co- mer containing at least 87% by weight of vinylidene ride, and (2) from 0.5 to 3.0 parts by weight of be- c acid.

2. The composition of claim 1 wherein the copolymer is a vinylidene chloride/acrylonitrile/methyl methacrylate/itaconic acid copolymer in the weight ratio of 91.5/6/2/0.5.

3. An organic polymeric film coated on at least one side with a continuous, adherent coating comprising essentially (1) 95 parts by weight of a copolymer of vinylidene chloride and at least one other ethylenically unsaturated monomer copolymerizable therewith, said copolymer containing at least 87% by weight of vinylidene chloride, and (2) from 0.5 to 3.0 parts by weight of behenic acid.

4. The coated film of claim 3 wherein the organic polymeric film is regenerated cellulose film.

5. The coated film of claim 4 wherein the copolymer is a vinylidene chloride/acrylonitrile/methyl methacrylate/itaconic acid copolymer in the weight ratio of 91.5/6/2/0.5.

References Cited

UNITED STATES PATENTS 3,375,215  3/1968  Kane _____ 260—23
3,419,421  12/1968  Eastes _____ 117—138.8

JOSEPH L. SCHOFER, Primary Examiner

J. KIGHT III, Asssitant Examiner

U.S. Cl. X.R.

117—138.8, 144, 145; 260—32.8, 33.6, 78.5, 85.5, 86.3, 87.7

Disclaimer 3,511,793.—*James Burnett Ezell*, Richmond, Va. MODIFIED VINYLIDENE CHLORIDE COPOLYMER COATING COMPOSITION. Patent dated May 12, 1970. Disclaimer filed May 31, 1972, by the assignee, *E. I. du Pont de Nemours and Company.*

Hereby enters this disclaimer to all claims of said patent.

[*Official Gazette January 2, 1973.*]